Oct. 29, 1963     C. J. EICHINGER     3,108,504

JIG FOR MODIFYING SPECTACLE FRAMES

Filed May 31, 1960     2 Sheets-Sheet 1

INVENTOR.
CLAIR J. EICHINGER
BY
Jack N. Nicks
ATTORNEY

Oct. 29, 1963 C. J. EICHINGER 3,108,504
JIG FOR MODIFYING SPECTACLE FRAMES
Filed May 31, 1960 2 Sheets-Sheet 2

INVENTOR.
CLAIR J. EICHINGER
BY
*Jack W. Hicks*
ATTORNEY

United States Patent Office 3,108,504
Patented Oct. 29, 1963

3,108,504
JIG FOR MODIFYING SPECTACLE FRAMES
Clair J. Eichinger, 678 S. Roy St., St. Paul, Minn.
Filed May 31, 1960, Ser. No. 33,022
1 Claim. (Cl. 81—3.5)

My invention relates to spectacles and more particularly to an improvement in a device for modifying spectacles whereby the frame and temple members may be fitted to the individual head and nose characteristics of the user of the spectacles.

While spectacle frames may be procured having different size temple members and with lens frames spaced at various distances, it is a rare occasion that a stock frame fits an individual's needs. The angle that the temple extends from the side of the lens frame has to be changed to open the temples the proper distance depending upon the shape of the head of the user. The outline of the temple has to be modified to fit the ear of the individual user, and the distance between lenses at the bridge must be modified to fit the individual user.

It is an object of my invention to provide a jig whereby a stock spectacle may be modified in all respects necessary for a perfect fit for the user. It is a further object to provide a device for changing the angle of the temple with regard to the lens frame to thereby open the distance between the temples. It is an additional object to provide a device for modifying the outline edge of the temple member of the spectacle to fit the ear relative to the head. It is a still further object to provide a device for modifying the bridge of the lens frame whereby the distance between lenses may be changed to fit the individual needs.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

Figures 1, 2, 3:
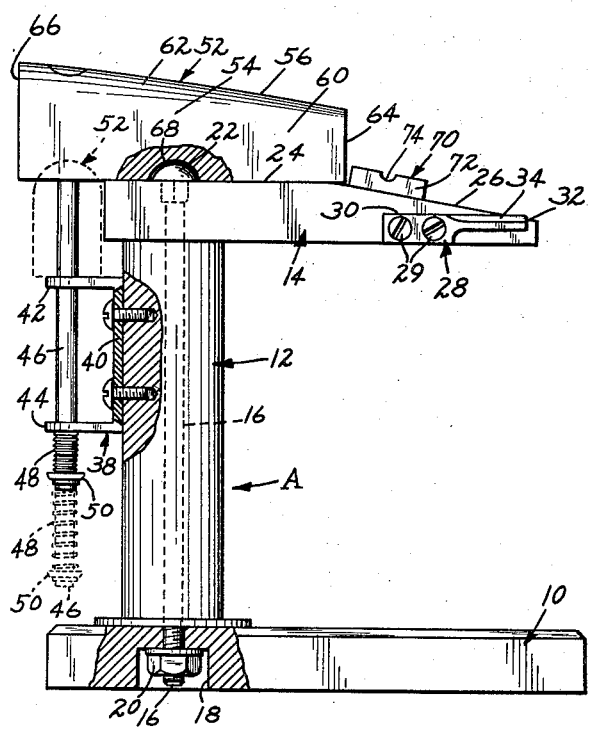
FIGURE 1 is a side elevational view of my jig, portions of which are broken away, the former block and supporting rod therefore being shown in an alternative position in broken lines.
FIGURE 2 is a front elevational view of the jig.
FIGURE 3 is a top plan view of my jig.
Figure 4:
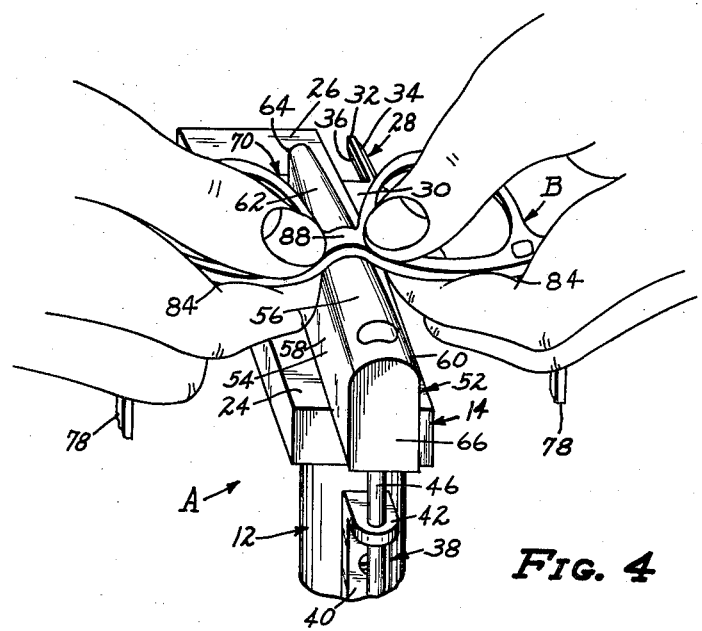
FIGURE 4 is a perspective view of the upper portion of the jig showing a lens frame held in position on the former member for modifying.

Referring to the drawings in detail, my jig A includes the flat base member 10 and mounted thereon is the upright vertical support 12 which is offset from the center of the base. Secured to the top of the support 12 at one end thereof is the platform member 14 which overlies the base 10 in parallel relation thereto. The platform 14 is secured in a fixed position by means of the elongated bolt 16 which extends through the platform 14, the support 12 and partially into the recess 18 formed in the underside of the base 10 where it is secured by the nut 20. The upper end of the bolt 16 is formed with a rounded head portion 22. The platform member 14 is generally rectangular in formation and is formed with the flat top portion 24 which terminates in the downwardly extending angularly disposed front surface portion 26.

The numeral 28 designates a rack which is secured to the side of the platform 14 adjacent the forward end thereof by means of the screws 29. The rack 28 is formed of the main base body portion 30 and extending from the outer edge thereof is the leg portion 32. The leg 32 has formed thereon the angularly disposed surfaces 34 and 36 extending substantially parallel throughout the length of the leg 32. As a result of the leg 32 extending from the outer edge of the base 30 the leg is thereby spaced from the side of the platform 14 which allows the temple to lie between the leg 32 and the side of platform 14, particularly as shown in FIGURE 6, so that the same may be filed as hereinafter set forth.

Figures 5, 6:
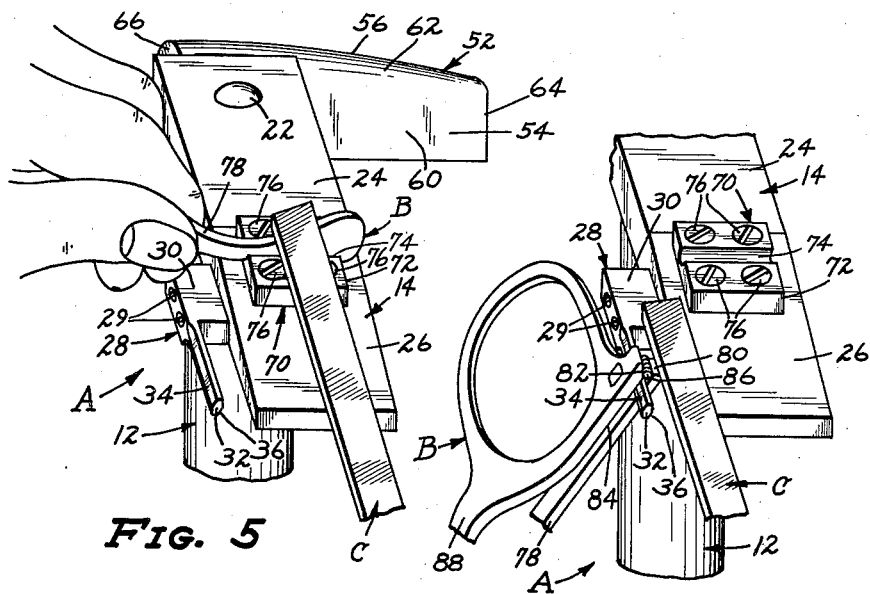
FIGURE 5 is a perspective view of a top portion of the jig showing a temple member in position on the jig for filing and modification on the edge thereof, with the former member in a lowered retracted position.
FIGURE 6 is a perspective view of a top portion of the jig with the lens frame in position for filing.

The support 12 is of a height whereby the spectacle frame B may be placed in the position shown in FIGURE 6 without the lower end of the frame contacting the base 10.

Further provided is the bracket 38 comprising the base portion 40 and the right angular extending flange portions 42 and 44. The flanges 42 and 44 each have a hole formed therethrough adapted to slidably receive the rod 46. The rod 46 is urged downwardly by means of the coil spring 48 mounted thereon and positioned between the flange 44 and the shoulder member 50 secured to the lower end of the rod 46.

The upper end of the rod 46 is secured to the rear end of the bridge former block member 52. The former member 52 includes the body member 54 which is tapered horizontally from the top rear end to the front end as at 56, and the same is tapered vertically from the rear to the front on each side of the longitudinal axis as at 58 and 60, thereby forming a compound taper. Both tapers join at the top edge thereof in the arcuate and angular forming edge 62. The arcuate forming edge 62 progressively increases from a narrow front end portion 64 to a larger rear end portion 66.

The spring urged rod 46 maintains the bridge former block 52 upon the upper flat surface of the platform 14, and the former 52 is kept in longitudinal alignment with the platform by means of the rounded head portion 22 of the bolt 16 engaging the recess 68 formed in the underside of the former 52. The former 52 may be easily removed from the top of the platform 14 by lifting slightly and forcing the same to one side and clear of the platform where it falls into the lowered position indicated in broken lines in FIGURES 1 and 3 and in full lines in FIGURE 5. In the lowered position, the former 52 rests upon the upper flange 42 of the bracket 38. When it is desired to place the former block upon the platform 14, the same is lifted against the action of the spring 48, turned and placed upon the platform.

Further provided is the filing block member 70 which is formed of the flat block-like body member 72. The upper surface of the filing block 70 is formed with an elongated recess 74 which runs transversely of the block and the platform 14. In addition, the block 70 is secured on the inclined surface portion 26 of the platform by means of the screws 76, the angular attitude of the filing block 70 produced by securing it upon the angularly disposed front surface 26 of the platform 14 facilitates the filing of the temple members hereinafter described.

Use and Operation

Let it be assumed that it is desired to fit a stock spectacle frame to the head of an individual. The spectacle is illustrated as B, and in order to have the opening or space between the temple members 78 the distance required for a given individual's head, the opening or space may be increased by filing the angular end portion 80 of the temple member 78 which contacts the angular end portion 82 of the lens frame 84. With the angle at 80 increased the temple 78 will be positioned outwardly further from the opposite temple member.

With my jig A the filing of the angle at 80 is done by placing the temple 78 in close proximity to the lens frame portion 84 with the leg 32 between the same at the outer ends thereof with the lens frame and hinge 86 thereof resting upon the arm 32. In this position the lens frame and temple 78 are substantially against the angular surfaces 34 and 36 of the leg 32 thereby allowing the temple 78 to be angularly disposed to the vertical whereby the end angle portion 80 is substantially in a horizontal position for easy filing by means of a file C as shown particularly in FIGURE 6. With the temple so held there is virtually no chance of the file slipping and marring the temple.

The temple 78 requires reshaping at the lower rear edge thereof so that it engages the ear properly and such edge contours may be shaped by placing the edge of the temple 78 in the recess 76 of the filing block 70 particularly as illustrated in FIGURE 5. In this position, the former block 52 is lifted and swung to the position as shown in FIGURE 5 so that it is out of the way of the file C. In addition, the fact that the filing block 70 is mounted on the inclined surface 26 of the platform 14 makes for easy filing with no chance of engagement of the file with the platform 14 when filing the temple member 78. With the temple firmly held in the recess of the filing block 70, it is a simple matter to file the correct angle on the end of the temple and with a further benefit that the file or temple member will not move whereby the file will not contact and mar the temple member.

The former block 52 is returned to the position of FIGURES 1-4, and to change the width of the bridge portion 88 of the frames B to change the distance between lenses (DBL) to fit the need of the user, the bridge portion is heated by holding it in a hot sand bath or other mode of heating. When the portion 88 is sufficiently heated, the frames B are held in both hands, as in FIGURE 4, and the portion 88 pressed upon the arcuate taper surface. The bridge portion 88 may then be molded to a greater or lesser width depending upon the area of the block 52 that is used. The bridge for example, may be arched slightly more by pressing it upon the former at a spot where the radius of the arcuate portion of the former block 52 is less than the radius of the bridge. As a result, the bridge is shortened and the distance between the lenses is decreased.

I have thus provided a jig for giving a complete fit of the spectacle to the individual user.

The invention is not to be understood as restricted to the details set forth since these may be modified within the scope of the appended claim without departing from the spirit and scope of the invention.

Having thus described the invention, what I claim as new and desire to secure by Letters Patent is:

In a jig for modifying the temple member of a spectacle frame, a base having a support extending vertically therefrom, a horizontal platform connected to said support at the top thereof and overlying said base, a rack connected to one edge of said platform, said rack including a base secured to said edge and a reduced leg portion extending horizontally therefrom in spaced parallel relation to said edge of said platform, said leg portion having angularly disposed work engaging surfaces, whereby a hinged temple member of a spectacle frame may be supported on said leg portion for filing without removing the temple member from its frame portion.

References Cited in the file of this patent

UNITED STATES PATENTS

| | | |
|---|---|---|
| 420,970 | Seaman | Feb. 11, 1890 |
| 521,802 | Lutz | June 26, 1894 |
| 1,254,274 | Pryor | Jan. 22, 1918 |
| 1,301,275 | Kraehmer | Apr. 22, 1919 |
| 2,243,905 | Hubschneider | June 3, 1941 |
| 2,502,088 | Gorski | Mar. 28, 1950 |
| 2,593,538 | Cleveland | Apr. 22, 1952 |
| 2,661,645 | Heath | Dec. 8, 1953 |
| 2,765,683 | Cutcher | Oct. 9, 1956 |

FOREIGN PATENTS

| | | |
|---|---|---|
| 1,160,007 | France | July 7, 1958 |